US009317296B2

(12) United States Patent
Rogers et al.

(10) Patent No.: US 9,317,296 B2
(45) Date of Patent: Apr. 19, 2016

(54) HIGH LEVEL SOFTWARE EXECUTION MASK OVERRIDE

(71) Applicant: ADVANCED MICRO DEVICES, INC., Sunnyvale, CA (US)

(72) Inventors: Timothy G. Rogers, Redmond, WA (US); Bradford M. Beckmann, Redmond, WA (US); James M. O'Connor, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 644 days.

(21) Appl. No.: 13/725,063

(22) Filed: Dec. 21, 2012

(65) Prior Publication Data

US 2014/0181467 A1  Jun. 26, 2014

(51) Int. Cl.
*G06F 15/00* (2006.01)
*G06F 15/76* (2006.01)
*G06F 9/38* (2006.01)
*G06F 9/30* (2006.01)

(52) U.S. Cl.
CPC .......... *G06F 9/3887* (2013.01); *G06F 9/30036* (2013.01)

(58) Field of Classification Search
CPC ....................................... G06F 9/3887
USPC .......................................... 712/22
See application file for complete search history.

(56) References Cited

U.S. PATENT DOCUMENTS

| 8,200,940 B1 * | 6/2012 | Lindholm ....................... 712/22 |
| 2012/0194527 A1 | 8/2012 | Hartog et al. |
| 2014/0123150 A1 * | 5/2014 | Lindholm et al. ............ 718/103 |

* cited by examiner

*Primary Examiner* — Chun-Kuan Lee
(74) *Attorney, Agent, or Firm* — Park, Vaughan, Fleming & Dowler LLP

(57) ABSTRACT

Methods, and media, and computer systems are provided. The method includes, the media includes control logic for, and the computer system includes a processor with control logic for overriding an execution mask of SIMD hardware to enable at least one of a plurality of lanes of the SIMD hardware. Overriding the execution mask is responsive to a data parallel computation and a diverged control flow of a workgroup.

28 Claims, 2 Drawing Sheets

HIGH LEVEL SOFTWARE EXECUTION MASK OVERRIDE

TECHNICAL FIELD

The technical field relates generally relates to altering software code for optimization on single instruction multiple data (SIMD) hardware, and more particularly relates to inserting mask override code to enable lanes of the SIMD hardware.

BACKGROUND

The desire to use a graphics processing unit (GPU) for general computation has become much more pronounced recently due to the GPU's performance per unit power and/or cost. GPUs, however, have traditionally operated in a constrained programming environment available primarily for the acceleration of graphics. With the advent of multi-vendor supported OpenCL®. and DirectCompute®. standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) programming model, (iv) compiling to multiple target instruction set architectures, and (v) providing quality of service (QoS) guarantees between processes, (ISAs)—all while minimizing power consumption.

In another example, computational inefficiencies may arise in existing computing systems when each of the threads in a wavefront, executing the same software program on a GPU, encounters conditional code. A wavefront is the most basic unit of scheduling of a GPU. Some threads may evaluate the condition as true and other threads may evaluate the condition as false. When conditional sections of code become more complex or include loops with different iteration counts per thread, the threads in the wavefront diverge and may never reconverge, which can cause significant performance loss. In a worst case scenario, for example, a processor may execute only one thread at a time instead of a full wavefront. Thus, if the wavefront includes 64 threads, the processor operates at only 1/64 of peak performance.

SUMMARY OF EMBODIMENTS

Methods, and media, and computer systems are provided. In some embodiments, a method for operating a computing system includes overriding an execution mask of single instruction multiple data (SIMD) hardware to enable at least one of a plurality of lanes of the SIMD hardware. Overriding the execution mask is responsive to a data parallel computation and a diverged control flow of a workgroup In some embodiments, a method for operating a computing system includes indicating a number of lanes of a plurality of lanes of single instruction multiple data (SIMD) hardware that are to be overridden in an execution mask responsive to a mask parameter, overriding the execution mask using the mask parameter to enable at least one of the plurality of lanes of the SIMD hardware, and instructing the SIMD hardware to resume diverged execution of the software code. Overriding the execution mask is responsive to a data parallel computation and a diverged control flow of a workgroup, and further responsive to detecting software code that is for SIMD hardware that runs branch instructions.

In some embodiments, a non-transitory computer readable medium stores control logic for operating a computing system. The control logic includes control logic instructions to override an execution mask of single instruction multiple data (SIMD) hardware to enable at least one of a plurality of lanes of the SIMD hardware responsive to a data parallel computation and a diverged control flow of a workgroup.

In some embodiments, a computer system includes a processor. The processor includes control logic configured to override an execution mask of single instruction multiple data (SIMD) hardware to enable at least one of a plurality of lanes of the SIMD hardware responsive to a data parallel computation and a diverged control flow of a workgroup.

BRIEF DESCRIPTION OF THE DRAWINGS

Advantages of the embodiments disclosed herein will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiments described herein as "exemplary" are not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description, or for any particular computing system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computing systems and other functional aspects of a computing system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in the embodiments disclosed herein.

Figure 1A:
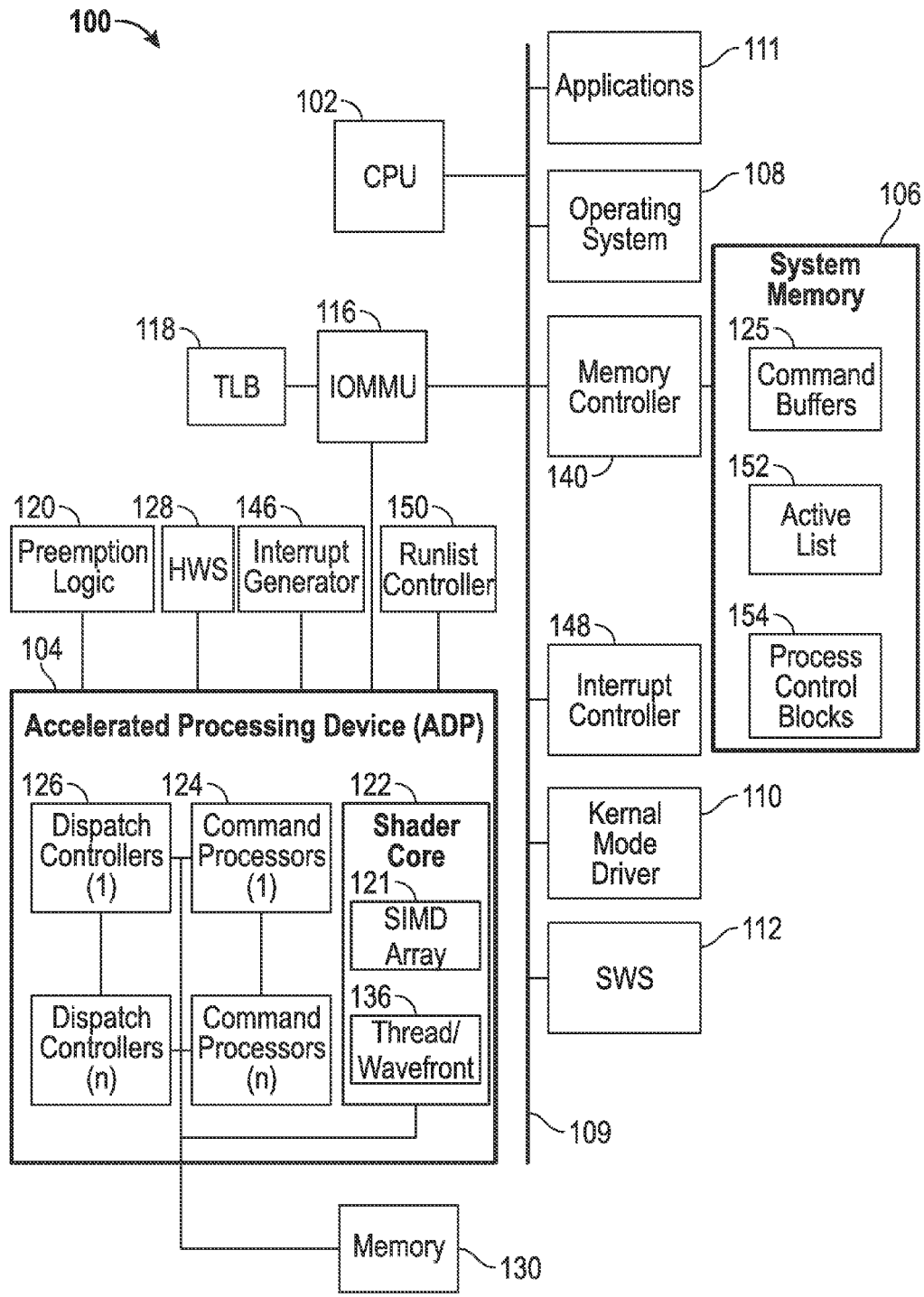
FIG. 1A is a simplified block diagram of a computing system according to some embodiments.

FIG. 1A is an exemplary illustration of a unified computing system 100 including a central processing unit (CPU) 102 and an accelerated processing device (APD) 104. CPU 102 may include one or more single or multi core CPUs. An APD may be any cooperating collection of hardware and/or software that performs functions and computations associated with accelerating graphics processing tasks, data parallel tasks, or nested data parallel tasks in an accelerated manner with respect to resources such as conventional CPUs, conventional GPUs, and/or combinations thereof. Although GPUs, accelerated processing units (APUs), and general purpose graphics processing unit (GPGPU) are commonly used terms in this field, the expression "accelerated processing device (APD)" is considered to be a broader expression. In the example provided, the system 100 is formed on a single silicon die or package that combines CPU 102 and APD 104 to provide a unified programming and execution environment. This environment enables the APD 104 to be used as fluidly as the CPU 102 for some programming tasks. In some embodiments, the CPU 102 and the APD 104 are formed separately and mounted on the same or different substrates.

In some embodiments, system 100 also includes a memory 106, an operating system 108, and a communication infrastructure 109. The operating system 108 and the communication infrastructure 109 are discussed in greater detail below.

The system 100 further includes a kernel mode driver (KMD) 110, a software scheduler (SWS) 112, and a memory management unit 116, such as an input/output memory management unit (IOMMU). Components of system 100 may be implemented as hardware, firmware, software, or any combination thereof. In some embodiments the system 100 includes one or more software, hardware, and firmware components in addition to or different from those shown in FIG. 1A. A driver, such as KMD 110, communicates with a device through an interconnect or communications subsystem. When a calling program invokes a routine in the driver, the driver issues commands to the device. Once the device sends data back to the driver, the driver may invoke routines in the original calling program. In general, drivers are hardware-dependent and operating-system-specific to provide the interrupt handling required for any necessary asynchronous time-dependent hardware interface.

CPU 102 may include (not shown) one or more of a control processor, field programmable gate array (FPGA), application specific integrated circuit (ASIC), or digital signal processor (DSP). CPU 102 executes at least a portion of the control logic that controls the operation of computing system 100. For example, the CPU 102 executes the operating system 108, KMD 110, SWS 112, and applications 111. In the example provided, the CPU 102 initiates and controls the execution of applications 111 by distributing the processing associated with applications 111 across the CPU 102 and other processing resources, such as the APD 104.

APD 104 executes commands and programs for selected functions, such as graphics operations and other operations that may be particularly suited for parallel processing. In general, APD 104 is frequently used for executing graphics pipeline operations, such as pixel operations, geometric computations, and rendering an image to a display. In some embodiments, APD 104 also executes compute processing operations (e.g., those operations unrelated to graphics such as video operations, physics simulations, computational fluid dynamics, etc.), based on commands or instructions received from CPU 102. For example, commands may be considered special instructions that are not typically defined in the instruction set architecture (ISA). A command may be executed by a special processor, such a dispatch processor, command processor, or network controller. In some embodiments instructions may be considered, for example, a single operation of a processor within a computer architecture. In some embodiments that use two sets of ISAs, some instructions are used to execute x86 programs and some instructions are used to execute kernels on an APD compute unit.

Figure 1B:
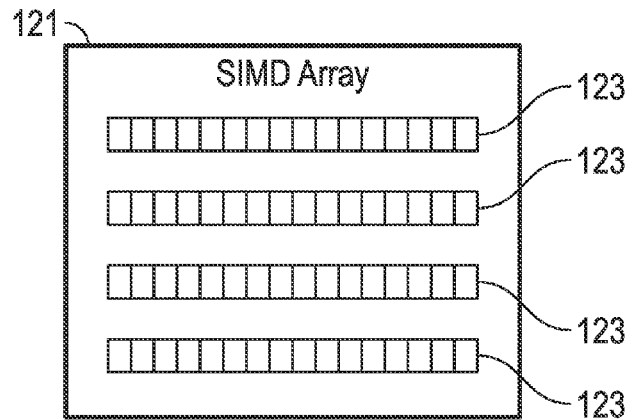
FIG. 1B is a simplified block diagram of a portion of the computing system of FIG. 1A according to some embodiments.

APD 104 may include compute units, such as one or more single instruction multiple data (SIMD) processing cores or SIMD arrays 121. In the example provided, the compute units are referred to collectively as shader core 122. In the embodiments described herein a SIMD is a pipeline or programming model where a kernel is executed concurrently on multiple processing elements. The processing elements have independent data and a shared program counter to execute an identical set of instructions. The use of predication enables work items to participate or not participate for each issued command. Each APD 104 compute unit may include one or more scalar and/or vector floating-point units, arithmetic and logic units (ALUs). In some embodiments, the ALUs are arranged into four SIMD arrays 121 in the shader core 122 that each include 16 processing elements, or lanes 123. Each SIMD array 121 executes a single instruction across the lanes 123 to a block of 16 work items, as illustrated in FIG. 1B. It should be appreciated that other configurations or grouping of ALUs, SIMD arrays, and lanes per array may be utilized. Each work item is mapped to a lane during execution. An execution mask indicates which of the lanes 123 are active and are to be executed. For example, the execution mask may include one bit per lane to indicate to the hardware that the lane is active and that the instructions are valid for that set of data.

The APD compute unit may include special purpose processing units (not shown), such as inverse-square root units and sine/cosine units. In the example provided, the shader core 122 includes a local data store (LDS) memory. The LDS is a high-speed, low-latency memory private to each compute unit. The LDS is a full gather/scatter model so that a workgroup can write anywhere in an allocated space.

In some embodiments, each compute unit (e.g., SIMD processing core) may execute a respective instantiation of a particular work item to process incoming data. A work item is one of a collection of parallel executions of a kernel invoked on a device by a command. A work item may be executed by one or more processing elements as part of a workgroup executing on a compute unit. A work item is distinguished from other executions within the collection by a global ID and a local ID. A subset of work items in a workgroup that execute simultaneously together on a SIMD may be referred to as a wavefront 136. The width of a wavefront is a characteristic of the hardware of the compute unit (e.g., SIMD processing core). As referred to herein, a workgroup is a collection of related work items that execute on a single compute unit. In some embodiments, all wavefronts from a workgroup are processed on the same SIMD processing core. Wavefronts may also be referred to as warps, vectors, or threads.

Some graphics pipeline operations, such as pixel processing and other parallel computation operations, may require that the same command stream or compute kernel be performed on streams or collections of input data elements. Respective instantiations of the same compute kernel may be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

An execution mask and work item predication are used to enable divergent control flow within a wavefront, where each individual work item may take a unique code path through the kernel. Shader core 122 may simultaneously execute a predetermined number of wavefronts 136, where each wavefront 136 includes multiple work items.

Within the system 100, APD 104 includes graphics memory 130. It should be appreciated that graphics memory 130 is not limited to graphics only use. Graphics memory 130 may be used during computations in APD 104. Additionally, individual compute units (not shown) within shader core 122 may each include a local data store (not shown). In some embodiments, APD 104 includes access to graphics memory 130, as well as access to the memory 106. In some embodiments, APD 104 includes access to dynamic random access memory (DRAM) or other such memories (not shown) that are attached directly to the APD 104 and are separate from memory 106.

In some embodiments, APD 104 further includes one or "n" number of command processors (CPs) 124. CP 124 controls the processing within APD 104, retrieves commands to be executed from command buffers 125 in memory 106, and coordinates the execution of those commands on APD 104. CP 124 may be implemented in hardware, firmware, software, or a combination thereof. In some embodiments, CP 124 is implemented as a reduced instruction set computer (RISC) engine with microcode for implementing logic, including scheduling logic.

A plurality of command buffers 125 may be maintained with each process scheduled for execution on the APD 104. In some embodiments, CPU 102 inputs commands based on applications 111 into the appropriate command buffers 125. As referred to herein, an application is the combination of the program parts that will execute on the compute units within the CPU 102 and APD 104.

APD 104 further includes one or "n" number of dispatch controllers (DCs) 126. As used herein, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 is implemented as part of CP 124.

System 100 further includes a hardware scheduler (HWS) 128 for selecting a process from a run list 150 for execution on APD 104. HWS 128 may select processes from run list 150 using a round robin method, priority level, or based on other scheduling policies. The priority level, for example, may be dynamically determined. HWS 128 may also include functionality to manage the run list 150 by adding new processes and deleting existing processes from run-list 150. The run list management logic of HWS 128 is sometimes referred to as a run list controller (RLC).

In some embodiments, when HWS 128 initiates the execution of a process from run list 150, CP 124 begins retrieving and executing commands from the corresponding command buffer 125. In some instances, CP 124 may generate one or more commands to be executed within APD 104, which correspond with commands received from CPU 102. CP 124, together with other components, implements a prioritizing and scheduling of commands on APD 104 in a manner that improves or maximizes the utilization of the resources of APD 104 and/or system 100.

APD 104 may have access to or may include an interrupt generator 146. Interrupt generator 146 may be configured by APD 104 to interrupt the operating system 108 when interrupt events, such as page faults, are encountered by APD 104. For example, APD 104 may rely on interrupt generation logic within IOMMU 116 to create the page fault interrupts noted above.

In the example provided, APD 104 further includes preemption and context switch logic 120 for preempting a process currently running within shader core 122. Context switch logic 120 includes functionality to stop the process and save a current state (e.g., shader core 122 state, and CP 124 state). As referred to herein, the term state may include an initial state, an intermediate state, and/or a final state. An initial state is a starting point for a machine to process an input data set according to a programming order to create an output set of data. There is an intermediate state, for example, that is stored at several points to enable the processing to make forward progress. This intermediate state is sometimes stored to allow a continuation of execution at a later time when interrupted by another process. There is also a final state that may be recorded as part of the output data set Preemption and context switch logic 120 may also include logic to context switch another process into the APD 104. The functionality to context switch another process into running on the APD 104 may include instantiating the process (e.g., through the CP 124 and DC 126 to run on APD 104), restoring any previously saved state for that process, and starting execution of the process.

In the example provided, memory 106 includes non-persistent memory, such as DRAM (not shown). Memory 106 may store processing logic instructions, constant values, variable values during execution of portions of applications or other processing logic, or other desired information. For example, parts of control logic to perform one or more operations on CPU 102 may reside within memory 106 during execution of the respective portions of the operation by CPU 102. During execution, respective applications, operating system functions, processing logic commands, and system software may reside in memory 106. Control logic commands that are fundamental to operating system 108 generally reside in memory 106 during execution. Other software commands, (e.g., kernel mode driver 110 and software scheduler 112) may also reside in memory 106 during execution of system 100.

In some embodiments, memory 106 includes command buffers 125 that are used by CPU 102 to send commands to APD 104. Memory 106 also contains process lists and process information (e.g., active list 152 and process control blocks 154). These lists as well as the process information are used by scheduling software executing on CPU 102 to communicate scheduling information to APD 104 and/or related scheduling hardware. Access to memory 106 may be managed by a memory controller 140, which is coupled to memory 106. For example, requests from CPU 102 or other devices for reading from or for writing to memory 106 are managed by the memory controller 140.

IOMMU 116 is a multi-context memory management unit. As used herein, context may be considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. IOMMU 116 includes logic to perform virtual to physical address translation for memory page access for devices, such as APD 104. IOMMU 116 includes logic to generate interrupts when, for example, a page access by a device such as APD 104 results in a page fault. IOMMU 116 may also include, or have access to, a translation lookaside buffer (TLB) 118. TLB 118, as an example, may be implemented in a content addressable memory (CAM) to accelerate translation of logical (i.e., virtual) memory addresses to physical memory addresses for requests made by APD 104 for data in memory 106.

In the example provided, communication infrastructure 109 interconnects the components of system 100 as needed, according to some embodiments. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. Communication infrastructure 109 may also include an Ethernet network or any other suitable physical communications infrastructure that satisfies an application's data transfer rate requirements. Communication infrastructure 109 includes the functionality to interconnect components, including components of computing system 100.

The operating system 108 in the example provided includes functionality to manage the hardware components of system 100 and to provide common services. In some embodiments, operating system 108 executes on CPU 102 and provides common services. The common services may include, for example, scheduling applications for execution within CPU 102, fault management, interrupt service, as well as processing input and output of other applications. In some embodiments, operating system 108 invokes an appropriate interrupt handling routine based on interrupts generated by an interrupt controller, such as interrupt controller 148. For example, upon detecting a page fault interrupt, operating system 108 may invoke an interrupt handler to initiate loading of the relevant page into memory 106 and to update corresponding page tables.

Operating system 108 may also include functionality to protect system 100 by mediating access to hardware components through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

In some embodiments, applications 111 include various programs or commands to perform user computations that are also executed on CPU 102. CPU 102 sends selected commands for processing on the APD 104. KMD 110 may implement an application program interface (API) through which CPU 102 or applications executing on other logic may invoke APD 104 functionality. For example, KMD 110 may enqueue commands from CPU 102 to command buffers 125 from which APD 104 will subsequently retrieve the commands. Additionally, KMD 110 together with SWS 112 may perform scheduling of processes to be executed on APD 104. SWS 112, for example, may include logic to maintain a prioritized list of processes to be executed on the APD 104. In some embodiments, applications executing on CPU 102 entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

It should be appreciated that computing system 100 may include more or fewer components than shown in FIG. 1A. For example, computing system 100 may include one or more input interfaces, non-volatile storage, one or more output interfaces, network interfaces, and one or more displays or display interfaces.

Shader core 122 simultaneously executes a number of wavefronts 136, each wavefront 136 includes a number of threads executing the same program. Code in each wavefront may include conditional code with conditional branches. In some embodiments, conditional branches in a SIMD processor are implemented using predication to enable only a subset of the SIMD processor's threads to execute the conditional code. When conditional sections of code become more complex or include loops with different iteration counts per thread, the threads in the wavefront diverge (e.g., the threads in the wavefront do not simultaneously execute the same instruction) and may never reconverge, which can cause significant performance loss. For example, when all threads in a wavefront execute the same instruction, only one clock cycle is needed to process the instruction for all threads in the wavefront. Multiple clock cycles may be needed, however, if the threads in the wavefront are not concurrently executing the same instruction. In a worst case scenario, the SIMD processor may execute only one thread at a time instead of a full wavefront. Thus, if the wavefront includes 64 threads, the SIMD processor will operate at 1/64 of peak performance. Therefore, it is computationally advantageous to concurrently execute as many threads as possible.

Furthermore, when work items within a wavefront diverge, all paths are executed serially. Threads whose control flow diverge are run by masking off execution on lanes which do not run the currently executed path. For example, when a wavefront contains a branch with two paths, the wavefront first executes one path, then the second path when the first path has completed. The total time to execute the branch is the sum of each path time.

For example, the program code presented in table 1 below may result in reduced efficiency when executed on SIMD hardware.

TABLE 1

```
void kernel_begin(int N, char* str1, char* str2)
{
    if ( threadIdx < N ) {
        do_string_compare(str1 ,str2);
    }
}
```

Because the control flow may be diverged when do_string_compare is called, the function does not co-ordinate threads in a workgroup to process each set of strings in parallel. It should be appreciated that do_string_compare may be replaced by any data parallel computation where the entire workgroup may be useful. Each thread operates on a separate set of strings when control flow is diverged. Such operation may lead to degraded performance as a result of memory divergence and load imbalance.

Methods and computer program products are disclosed herein for improving divergent branch execution in a SIMD processor. In general, the exemplary computing system 100 permits a high level language programmer or a compiler to explicitly override an execution mask of the SIMD hardware. By overriding the execution mask, data parallel computations may be performed more efficiently on SIMD hardware.

Figure 2:
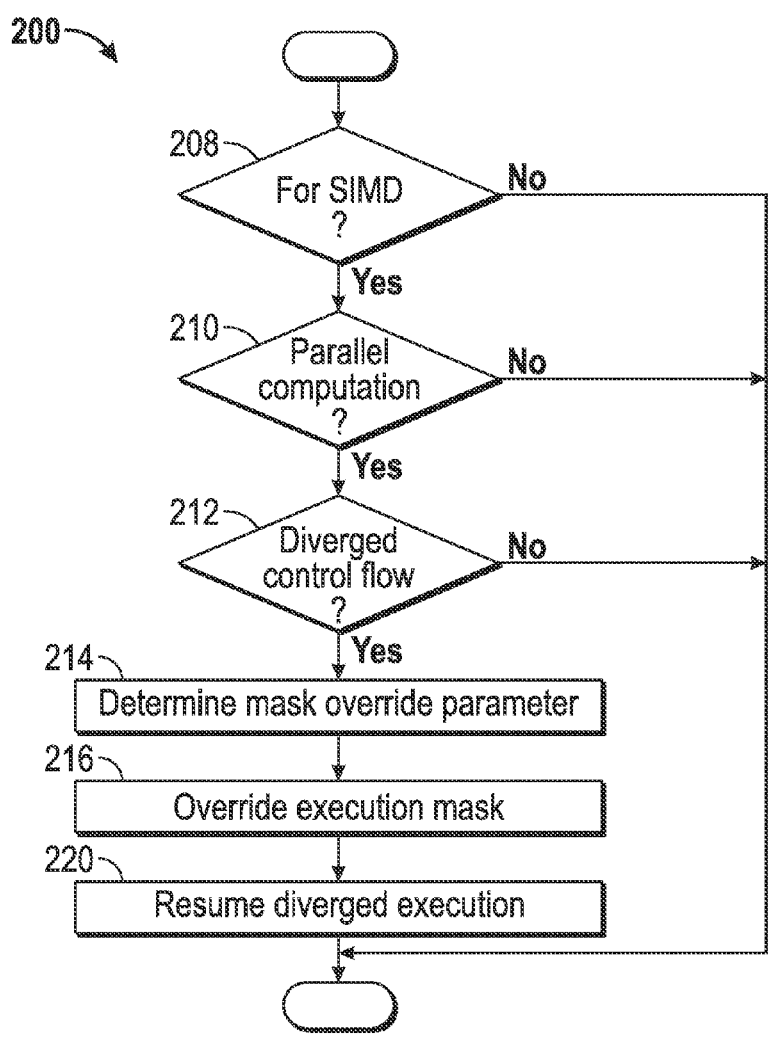
FIG. 2 is a flow diagram illustrating operations according to some embodiments.

Referring now to FIG. 2, operations 200 for preparing software code for execution on SIMD hardware are illustrated in a flow diagram. The operations 200 may be beneficial to performance on SIMD machines that run branch instructions.

Accordingly, it is determined at block 208 whether the software code is for SIMD hardware that runs branch instructions. The operations 200 may be performed by, for example, a high level language programmer using a computing system or a compiler using the computing system for use on the SIMD array 121.

At decision block 210 it is determined whether a data parallel computation is indicated by the software code for a workgroup. For example, at block 210 it may be determined that the do_string_compare function is to be called. When a data parallel computation is indicated by the software code, the operations 200 determine whether control flow for the work group is diverged at block 212. It should be appreciated that blocks 210 and 212 may be performed by a compiler, such as by inserting code that performs the blocks. For example, the compiler may determine whether code within a basic block or group of basic blocks do not modify a register state external to the basic block or group of basic blocks. The compiler may further determine that there is an inter-lane reliance on data. Accordingly, the compiler may automatically detect when the program would benefit from overriding the execution mask without relying on the programmer to explicitly specify the override.

When the control flow is diverged, a mask override parameter is determined in block 214. The mask override parameter indicates which of the lanes 123 are to be indicated as active in an execution mask override. The mask parameter may be used, for example, when only a subset of the work items will need to be active. For example, the parameter may indicate that only the lower 16 work items of the workgroup are to be active by selecting the parameter OxFFFF. In some embodiments, no parameter is explicitly set and the entire workgroup is considered to be selected as active.

The execution mask of the SIMD array 121 is overridden at block 216. For example, software code may be generated to override the execution mask. Overriding the execution mask enables certain lanes 123 of the SIMD array 121. For example, an instruction may be included to set or clear a bit of the execution mask that indicates whether the lane associated with the bit will execute the current instruction. When the override portion of the code has completed, the execution mask may revert back to the status of the execution mask when the override portion was entered. Accordingly, a programmer may effectively take control of all of the execution resources of the machine when the programmer knows that the parallel nature of the hardware would improve execution of the software.

In some embodiments, a compiler inserts code to perform the operations 200. In some embodiments, the high level application programmer may insert_override_exec_mask_ (OxFFFF) to override the execution mask for the lower 16 work items of the workgroup. In some embodiments, the high level language programmer may alter the code of Table 1 to resemble the code presented in Table 2.

TABLE 2

```
void kernel_begin(int N, char* str1, char* str2)
{
    if ( threadIdx < N ) {
        _override_exec_mask_ {
            do_string_compare(str1 ,str2);
        }
    }
}
```

In some embodiments, the override mask is implemented with an assembler instruction that writes to the execution mask register. Coordination between multiple threads that will override the execution mask may be accomplished in software when a programmer ensures that only one thread will take over all the lanes at a time. In some embodiments, the underlying hardware includes a mechanism to serialize multiple threads that will override the execution mask so that only one thread at a time will be permitted to use all lanes of the machine.

At block 220 diverged execution is resumed. For example, a software programmer may insert software code indicating that diverged execution is to be resumed. Accordingly, the execution mask override will no longer be active and the execution mask will take the condition indicated by the diverged control flow.

When the operations 200 are implemented, the runtime generally runs all the active wavefronts in a workgroup to the_override_exec_mask_marker, execute the scoped code (e.g., do_string_compare) starting with a fully active execution mask across the workgroup, and return from the scoped code and resume diverged execution prior to the_override_exec_mask_marker. Accordingly, the operations 200 improve utilization of the parallel nature of the SIMD hardware.

The operations illustrated in FIG. 2 may be governed by instructions that are stored in a non-transitory computer readable storage medium and that are executed by at least one processor of the computing system 100. Each of the operations shown in FIG. 2 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The provided method and storage medium have several beneficial attributes that promote increased performance of single program multiple thread code on SIMD hardware. For example, higher utilization of the SIMD hardware may be achieved. Furthermore, string comparison and other Standard Template Library (STL) like services within branchy code are improved and software prefetching performance in branchy code is improved. Furthermore, the impact of memory divergence on performance is reduced because workgroups are able to coordinate accesses instead of operating in separate logical execution streams. Additionally, permitting programmers to write more convergent code may improve power efficiency.

While at least one exemplary embodiment has been presented in the foregoing detailed description of the disclosed embodiments, it should be appreciated that a vast number of variations exist. It should also be appreciated that the exemplary embodiment or exemplary embodiments are only examples, and are not intended to limit the scope, applicability, or configuration of the disclosed embodiments in any way. Rather, the foregoing detailed description will provide those skilled in the art with a convenient road map for implementing the disclosed embodiments, it being understood that various changes may be made in the function and arrangement of elements of the disclosed embodiments without departing from the scope of the disclosed embodiments as set forth in the appended claims and their legal equivalents.

What is claimed is:

1. A method for operating a computing system, the method comprising:
    determining that control flow for a work group in program code is divergent, the work group comprising multiple threads of the program code, each thread executing on a corresponding one of a plurality of lanes in single instruction multiple data (SIMD) hardware; and
    inserting, into the program code, overriding program code configured to override an execution mask of the SIMD hardware to enable at least one of the plurality of lanes to process a corresponding thread.

2. The method of claim 1 further comprising determining that the program code is for SIMD hardware that runs branch instructions.

3. The method of claim 1 further comprising:
    generating a mask override parameter for the work group, the mask override parameter indicating which of the plurality of lanes is to be enabled; and
    configuring the overriding program code based on the mask override parameter.

4. The method of claim 3 wherein the mask override parameter indicates that a contiguous subset of the plurality of lanes are to be overridden in the execution mask.

5. The method of claim 3 wherein the mask override parameter further indicates that each of the plurality of lanes of the SIMD hardware associated with the workgroup are to be overridden in the execution mask.

6. The method of claim 1 wherein the determining and inserting are performed by a compiler during a compilation operation for the program code.

7. The method of claim 1 further comprising determining that the control flow for the work group is divergent when program code within at least one basic block modifies a register state external to the at least one basic block.

8. The method of claim 1 further comprising determining that the control flow for the work group is divergent when an inter-lane reliance on data exists for the work group.

9. The method of claim 1 further comprising inserting into the program code additional program code configured to cause the SIMD hardware to resume diverged execution of the program code.

10. The method of claim 1 further comprising determining the control flow for the work group is divergent when a specified string compare operation is present in the program code.

11. A method for operating a computing system, the method comprising:
    receiving program code that includes overriding program code, the overriding program code inserted into the program code based on determining that control flow for a work group in the program code is divergent, the work group comprising multiple threads of the program code, each thread executing on a corresponding one of a plurality of lanes in single instruction multiple data (SIMD) hardware;
    executing the overriding program code to determine a number of lanes of the plurality of lanes of the SIMD hardware that are to be overridden in an execution mask;
    based on the determined number of lanes, overriding the execution mask to enable at least one of the plurality of lanes of the SIMD hardware; and
    instructing the SIMD hardware to resume diverged execution of the program code.

12. The method of claim 11 wherein the overriding program code causes a contiguous subset of the plurality of lanes to be overridden in the execution mask.

13. The method of claim 11 wherein the overriding program code causes each of the plurality of lanes of the SIMD hardware associated with the workgroup to be overridden in the execution mask.

14. The method of claim 11 wherein the overriding program code is inserted in the program code by a compiler responsive to the compiler determining that program code within at least one basic block modifies a register state external to the at least one basic block or determining that an inter-lane reliance on data exists for the work group.

15. A non-transitory computer readable medium storing control logic for operating a computing system, the control logic including control logic instructions to:
    determine that control flow for a work group in program code is divergent, the work group comprising multiple threads of the program code, each thread executing on a corresponding one of a plurality of lanes in single instruction multiple data (SIMD) hardware; and
    insert, into the program code, overriding program code configured to override an execution mask of the SIMD hardware to enable at least one of the plurality of lanes to process a corresponding thread.

16. The non-transitory computer readable medium of claim 15 wherein the control logic further includes control logic instructions to determine that the program code is for SIMD hardware that runs branch instructions.

17. The non-transitory computer readable medium of claim 15 wherein the control logic further includes control logic instructions to generate a mask override parameter for the work group, the mask override parameter indicating which of the plurality of lanes is to be enabled; and
    configure the overriding program code based on the mask override parameter.

18. The non-transitory computer readable medium of claim 17 wherein the mask override parameter indicates that a contiguous subset of the plurality of lanes are to be overridden in the execution mask.

19. The non-transitory computer readable medium of claim 17 wherein the mask override parameter indicates that each of the plurality of lanes of the SIMD hardware associated with the workgroup are to be overridden in the execution mask.

20. The non-transitory computer readable medium of claim 15 wherein the control logic further includes control logic instructions to insert, into the program code, additional program code configured to cause the SIMD hardware to resume diverged execution of the program code.

21. A computer system comprising a processor including control logic configured to:
    determine that control flow for a work group in program code is divergent, the work group comprising multiple threads of the program code, each thread executing on a corresponding one of a plurality of lanes in single instruction multiple data (SIMD) hardware; and
    insert, into the program code, overriding program code configured to override an execution mask of the SIMD hardware to enable at least one of the plurality of lanes to process a corresponding thread.

22. The computer system of claim 21 wherein the control logic is further configured to determine that the program code is for SIMD hardware that runs branch instructions.

23. The computer system of claim 21 wherein the control logic is further configured to generate a mask override parameter for the work group, the mask override parameter indicating which of the plurality of lanes is to be enabled; and
    configure the overriding program code based on the mask override parameter.

24. The computer system of claim 23 wherein the mask override parameter indicates that a contiguous subset of the plurality of lanes are to be overridden in the execution mask.

25. The computer system of claim 23 wherein the mask override parameter indicates that each of the plurality of lanes of the SIMD hardware associated with the workgroup are to be overridden in the execution mask.

26. The computer system of claim 21 wherein the control logic is further configured to insert, into the program code, additional program code configured to cause the SIMD hardware to resume diverged execution of the program code.

27. The computer system of claim 21 further including a memory storing operational instructions for the processor.

28. The computer system of claim 27 further including a second processor electronically coupled with the processor and the memory.

* * * * *